(12) United States Patent
Staib et al.

(10) Patent No.: US 8,050,976 B2
(45) Date of Patent: Nov. 1, 2011

(54) SYSTEM FOR ON-LINE MERCHANT PRICE SETTING

(75) Inventors: William E. Staib, Coralville, IA (US); Raymond J. Mlejnek, Coralville, IA (US)

(73) Assignee: STB Enterprises, LLC, Coralville, IA (US)

( * ) Notice: Subject to any disclaimer, the term of this patent is extended or adjusted under 35 U.S.C. 154(b) by 1241 days.

(21) Appl. No.: 11/560,345

(22) Filed: Nov. 15, 2006

(65) Prior Publication Data

US 2007/0130090 A1   Jun. 7, 2007

Related U.S. Application Data

(60) Provisional application No. 60/737,071, filed on Nov. 15, 2005.

(51) Int. Cl.
*G06Q 30/00* (2006.01)

(52) U.S. Cl. .......... 705/26.1; 705/14.23; 705/14.38; 705/20; 705/35; 705/400

(58) Field of Classification Search .......... 705/14.23, 705/14.38, 20, 26.1, 35, 400
See application file for complete search history.

(56) References Cited

U.S. PATENT DOCUMENTS

| | | | |
|---|---|---|---|
| 5,675,510 A | 10/1997 | Coffey et al. | |
| 5,796,952 A | 8/1998 | Davis et al. | |
| 6,108,637 A | 8/2000 | Blumenau | |
| 6,115,680 A | 9/2000 | Coffee et al. | |
| 6,138,155 A | 10/2000 | Davis et al. | |
| 6,415,322 B1 | 7/2002 | Jaye | |
| 6,643,696 B2 | 11/2003 | Davis et al. | |
| 6,763,386 B2 | 7/2004 | Davis et al. | |
| 7,441,195 B2 | 10/2008 | Error et al. | |
| 7,603,373 B2 | 10/2009 | Error et al. | |
| 7,899,701 B1* | 3/2011 | Odom | 705/35 |
| 2002/0116348 A1* | 8/2002 | Phillips et al. | 705/400 |
| 2004/0059746 A1 | 3/2004 | Error et al. | |
| 2004/0098229 A1 | 5/2004 | Error et al. | |
| 2004/0122943 A1 | 6/2004 | Error et al. | |
| 2004/0199397 A1 | 10/2004 | Dresden | |
| 2004/0204979 A1 | 10/2004 | Eisenberg et al. | |
| 2004/0249643 A1 | 12/2004 | Ouyang et al. | |
| 2005/0071249 A1 | 3/2005 | Nix et al. | |
| 2005/0177785 A1 | 8/2005 | Shrader et al. | |

(Continued)

OTHER PUBLICATIONS

ChannelAdvisor Complete Online Marketing Documents. ChannelAdvisor Corporation. Retrieved on Dec. 17, 2006. 6 pages.

(Continued)

*Primary Examiner* — Yogesh C Garg
(74) *Attorney, Agent, or Firm* — Dorsey & Whitney LLP

(57) ABSTRACT

A method for setting a price for a product sold online by a subject merchant is provided. The method comprises accessing price information of at least one other merchant of the same product by applying a shopping robot to two or more shopping sites, including at least one price comparison site, with other offerings of the same product by other merchants; accessing pricing rules for the subject merchant that cover sales originating from the comparison site; applying the pricing rules to adjust the current product price at which the subject merchant offers the product on the two or more shopping sites to be more competitive; and responsive to a price adjustment that would reduce the product price so as to violate a specified profitability goal, increasing the shipping charges with which the merchant offers the product with the price adjustment on the two or more shopping sites.

29 Claims, 11 Drawing Sheets

U.S. PATENT DOCUMENTS

2005/0216844 A1  9/2005  Error et al.
2006/0149728 A1  7/2006  Error et al.

OTHER PUBLICATIONS

Channel Intelligence Online Marketing Document. Channel Intelligence, Inc. Patented Technology Platform. Retrieved on Dec. 17, 2006. 1 page.
"AB Testing: Too Little, Too Early?" Future Now, Inc. Http://www.futurenowinc.com. 2005. 14 pages.
NexTag Comparison Shopping Online Search Results Page. NexTag, Inc. 1 page. Retrieved on Dec. 17, 2006. 1 page.
"Hotwire (that *other* big new travel site)". Retrieved from Google Groups: rec.travel.air on Dec. 17, 2006. 5 pages.
Offermatica Online Marketing Documents. "A/B test your best ideas" Offermatica Corp. Retrieved on Dec. 17, 2006. 1 page.
Optimost Online Press Release and Marketing Documents. Optimost LLC. Retrieved on Dec. 17, 2006. 10 pages.
Shopping.com Merchant Account Center. Retrieved on Dec. 17, 2006. 1 page.
SiteSpect Online Marketing Documents. "Product Tour". SiteSpect, Inc. Retrieved on May 4, 2010 1 page.
Mangalindan, Mylene "Ad Vantage" *The Wall Street Journal Online* Jun. 19, 2006. 5 pages.
Omniture S-1 filing. http://sec.gov/Archives/edgar/data/1357525/00009501490600238/f18772a1sv1za.htm Retrieved from the internet on Aug. 23, 2010. 134 pages.
Netratings Inc.—Initiating Coverage. Gould, A.S., et al. Ntexis Bleichroeder, Inc. Analyst Report. 19 pages.
Heck, Mike "Chart Your Web site's success" InfoWorld: Product Guide: Coremetrics 2005: Review. Retrieved from http://www.infoworld.com/Coremetrics_2005/56256.html?view=1&curNodeId=0 on Dec. 17, 2006. 7 pages.
Nielsen NetRatings. http://www.nielsen-netratings.com/ Retrieved from the Internet on Aug. 8, 2006. 4pages.
Omniture. http://www.omniture.com/company Retrieved from the Internet on Aug. 8, 2006. 3 pages.
Google Analytics http://www.google.com/analytics/ Retrieved from the Internet on Aug. 8, 2006. 1 page.
WebSideStory http://www.websidestory.com/ Retrieved from the Internet on Aug. 8, 2006. 2 pages.
CoreMetrics http://www.coremetrics.com/ Retrieved from the Internet on Aug. 8, 2006. 2 pages.
WebTrends http://webtrends.com/ Retrieved from the Internet on Aug. 8, 2006. 3pages.
Utah Web Analytics Blog http://www.utahwebanalytics.com/blog/category/web-analytics-industry-news/ Retrieved from the Internet on Aug. 8, 2006. 6 pages.
Capterra Management Software http://www.capterra.com/catalogc-management-solutions Retrieved from the Internet on Aug. 8, 2006. 4pages.

* cited by examiner

Figure 4

Data Collection for Product UPC 111222333444 (not auctioned)

| Site/Channel | Total Purchase Price | Product Price | Shipping | Other Parameters [Seasonal period dates] |
|---|---|---|---|---|
| Seller A | $110.00<br>$100.00<br>$90.00 | In Season - $99.95<br>Pre-season - $89.95<br>End of season - $79.95 | $10.05 | Nov. 1-Dec. 28<br>Oct. 1-Nov. 1<br>Dec. 28-Jan. 10 |
| Seller B | $105.00<br>$95.00<br>$80.00 | In Season - $95.95<br>Pre-season - $85.95<br>End of season - $75.95 | $9.05 | Oct. 20-Dec. 29<br>Sept. 1-Oct. 20<br>Dec. 29-Jan. 9 |
| Seller C | $115.00<br>$105.00<br>$90.00 | In Season - $95.95<br>Pre-season - $85.95<br>End of season - $75.95 | $19.05 | Oct. 27-Dec. 29<br>Sept. 19-Oct. 27<br>Dec. 29-Jan. 15 |
| Seller D | $95.00<br>$90.00<br>$80.00 | In Season - $90.00<br>Pre-season - $85.00<br>End of season - $75.00 | $5.00 | Nov. 18-Dec. 27<br>Oct. 19-Nov. 18<br>Dec. 27-Jan. 5 |

Data Collection for Product UPC 111222333445 (auctioned)

| Site/Channel | Total Purchase Price | Product Price | Shipping | Other Parameters [Success rates] |
|---|---|---|---|---|
| Seller A | $108.00 | buy-it-now - $99.95<br>bid start - $59.95<br>reserve - $75.00 | $8.05 | 30% |
| Seller B | $106.00 | buy-it-now - $95.95<br>bid start - $51.95<br>reserve - $80.00 | $10.05 | 28% |
| Seller C | $107.00 | buy-it-now - $94.95<br>bid start - $0.00<br>reserve - $75.00 | $12.05 | 32% |
| Seller D | $106.00 | buy-it-now - $96.95<br>bid start - $19.95<br>reserve - $77.00 | $9.05 | 25% |

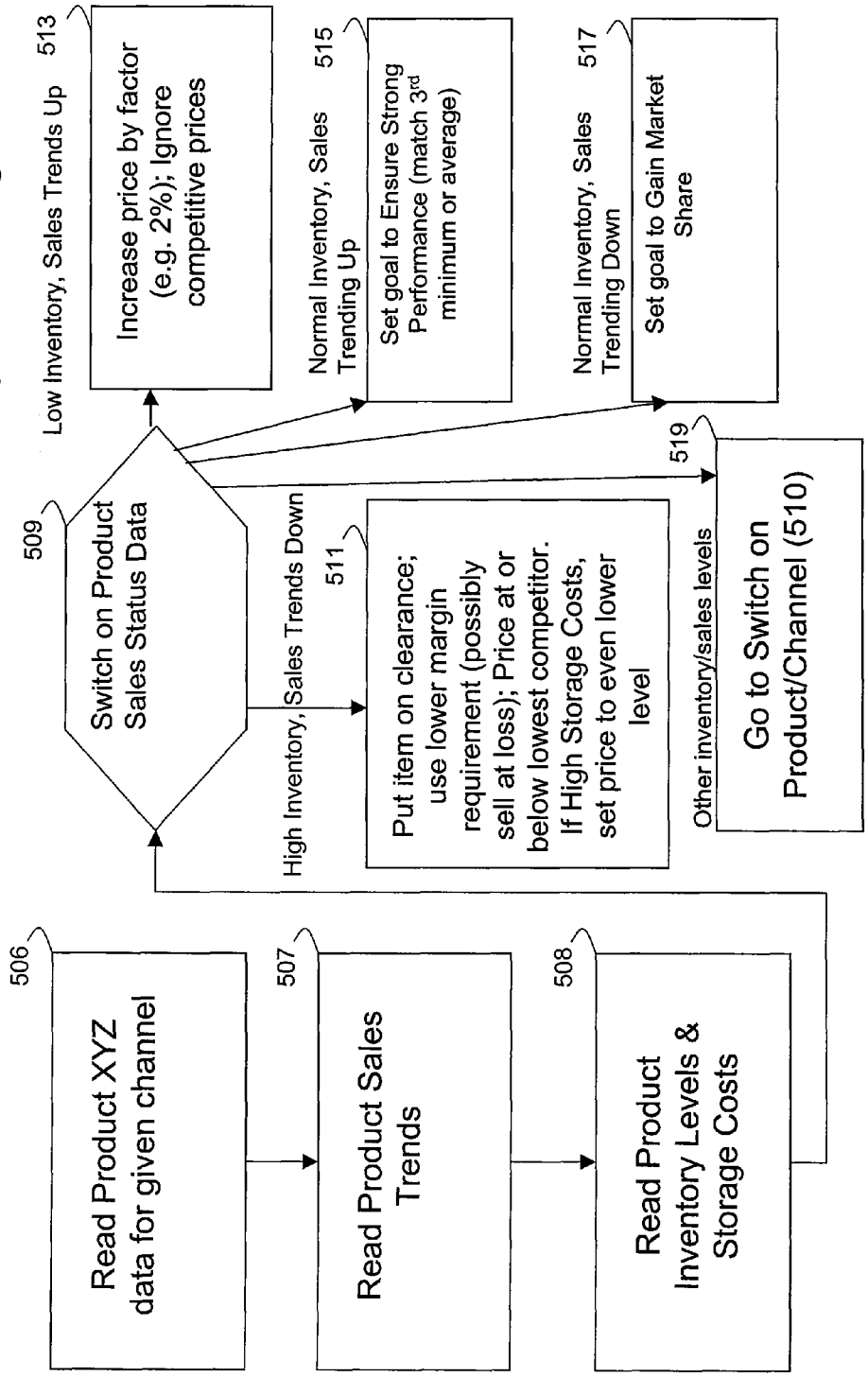
Figure 5A – Merchant Price Update Flow when Considering Sales Trends, Inventory, Storage pov2.txt    Figure 6a

Product XYZ (SM-WA-20052)
====================================

| abbrv | Product | formula | basis |
|---|---|---|---|
| APC | Average Product Cost purchases | = Sum( #Items * total price) | based on |
| DPM% | Desired Profit Margin % | = (UP - APC) / APC | merchant set |
| A1 | | | |
| DPMA | Desired Profit Margin Amount | = (APC * DPM%) | merchant set |
| A2 | | | |
| UP | Unit Price | = APC + DPMA | (MSP) |
| SP | Sell at Price | | set by system |
| MAP | Minimum Advertised Price | | set by supplier |
| MMP | Minimum Merchant Price | | set by merchant |
| MnSC | Minimum Shipping Cost | min( shipping options ) | set by shippers |
| MxSF | Maximum Shipping Flex | maximum overcharge | set by merchant |
| MnSP | Minimum Shipping Price | overcharge in use | set by system |
| TXR | Tax Rate | = 5% | set by law |
| TxA | Tax Amount | = TXR * UP | |
| TP | Total Price | = UP + TxA + MnSC | |
| TSPP | Test Sales Price Point | establish by tests | point where price performance goes non-linear down |
| TSC | Test Sales Confidence calculation | established by amount of tests | statistical |
| TSV | Test Sales Variable | 10% (range of price) | set by merchant |
| TSA | Test Sales Amount | 5% (% of inventory to test) | set by merchant |
| MTSC | Minimal Test Sales Confidence | | set by merchant |
| PG | Product Goal | global override or product | set by merchant |
| | Offered | | |
| | Sold | | |
| | Sales rate | | |

Goals
================================================================

| 1. | Max Profit possible | Use test data to set price as high over DPM as |
| 2. | Top 3 | Insure strong performance |
| 3. | Top 1 | gain maximum market share |
| 4. | Hold DPM | Hold to Desired Profit Margin |

XYZ Test Sales

Figure 6b

```
                                        POv2.txt
===============
price   offered         sales
-----------------------------------
238     120             8
240     150             7
242     180             9
244     210             11
246     240             12
247.5   100,000         5000
248     210             8
250     180             6
252     150             4
254     120             2

XYZ Channel Prices / performance
=====================================
channel         price           MnSP    Goal (set by merchant)  offered         sold
rate
----------
A               249             0       1
B               237             10      3
C bid-start     225             0       1
C buy-it-now    249             0       1
C reserve       266             0

Channel Costs for XYZ
=======================
        listing insertion       final   upload  store   picture category
Credit Card             transaction
Channel fee1    fee2            fee3    fee4    fee5    fee6    fee7            fee8
        fee9            total
-----------------------------------------------------------------------
A
B
C Channel A Fee Table
=====================
fee             type            amount
-------------------------------------
listing         flat            .01
insertion       flat            .01
final           percent         1%
upload          flat            0.1
store           flat            .01

Comparision Data XYZ
======================
channel UP      Tax     Min Ship Cost   Total Price             quantity1
Quantity Discount1 .........
----------------
A       259     5%      0               271.95                  2               505
B       247.5   7%      10.25           UP + Tax + MnSC
C       232     6%      13.95
```

Figure 6c

```
                                    POv2.txt
Shipping XYZ
================
Ship Method                    Ship Cost
------------------------------------------
UPS: ground                    9.97
UPS: 3 Day Select              [$17.48]
UPS: 2nd Day Air               [$20.55]
UPS: Next Day Air Saver        [$32.60]
UPS: Next Day Air              [$37.80]
UPS: Next Day Air Early AM     [$92.89]
```

Figure 8 – ProductSalesInventoryTrends database table schema.

CREATE TABLE [ProductSalesInventoryTrends](

[CatalogId] [int] NOT NULL, --sku or product id

[FirstAvailabilityDate] [datetime] NULL, -- Date when first started selling product. This helps to avoid marking down a product as clearance if it has just recently been listed for sale.

[Price] [money] NULL, -- sales price of product

[ItemCost] [money] NULL, -- merchant's cost for product

[QtyOnHand] [int] NULL, -- # of items in stock in warehouse

[InventValue] [money] NULL, -- value of items in inventory (same as ItemCost * QtyOnHand)

[StorageCostPerItemPerYear] [float] NULL, -- storage cost per year of a single item (function of product's size (e.g. cubic feet) an factor that estimates the cost of storage space and overhear per level of volume.)

[SalesAll] [int] NULL, -- # of units sold over all time

[MonthlySalesMoneyMo] [float] NULL, -- $ of sales during past month

[MonthlySalesMoneyQtr] [float] NULL,-- monthly average $ of sales during past quarter

[MonthlySalesMoneyYr] [float] NULL,-- monthly average $ of sales during past year

[MonthlySalesMo] [float] NULL,-- # of sales during past month

[MonthlySalesQtr] [float] NULL,-- monthly average # of sales during past quarter

[MonthlySalesYr] [float] NULL,-- monthly average # of sales during past year

[MonthsInventory] [int] NULL, -- # of months of inventory in stock (calculated by QtyOnHand / max(MonthlySalesMo,MonthlySalesQtr,MonthlySalesYr). This calculation will provide for a seasonality adjustment because we will consider the monthly sales over the past year if that is higher than most recent month's sales.)

SYSTEM FOR ON-LINE MERCHANT PRICE SETTING

CROSS-REFERENCE TO RELATED APPLICATION(S)

This application claims the benefit of U.S. Provisional Application No. 60/737,071, filed Nov. 15, 2005, the entire contents of which is incorporated herein by reference.

FIELD OF THE INVENTION

The present invention relates to a computer program system that collects information relevant to pricing for an online merchant and uses price-setting rules for optimizing an online merchant's profit from sales originating at ecommerce comparison-shopping web sites.

BACKGROUND OF THE INVENTION

Comparison shopping services like Froogle, Amazon, Yahoo Shopping, PriceWatch, NexTag, and Shopping.com provide on-line merchants with a free or relatively inexpensive way to gain access to new prospective customers. An online merchant provides one or more product descriptions and the corresponding pricing for display in a comparative listing with the same or similar products offered by other merchants. This may include just the goods price for each merchant or also shipping and handling pricing (and any necessary tax calculation), so that a true total price can be determined by a visitor to the comparison shopping service who wishes to explore and to place an order to a listed merchant. However, the very nature of comparison-shopping leads to price sensitive purchases and may tend to reduce the profit margins of online merchants that participate in such services.

It is often difficult for merchants to know the price at which their competition is selling a particular product. A number of other patent applications (e.g., U.S. Patent Publication Nos. 20040249643 and 20050071249) address this problem. However, the systems described in those publications focus on price setting and do not consider other adaptive changes such as modifying shipping cost that might affect marketplace positioning, nor do they address how to administer more than one price per item or the cost or type of the sales channels being used. In the following discussion of the invention, the term channel includes but is not limited to at least one comparison shopping service, at least one marketplace, at least one merchant shopping site or a combination of the three (for example a group comprising two comparison shopping services and a merchant shopping site, or a group comprising one shopping service, one marketplace, and three merchants.) That is, a channel represents one or more Internet sites where products are promoted and/or sold, and where some commonality makes it worthwhile to study sales of such sites together.

One technique that is available today to assist merchants in optimizing their business is "A/B Testing." This service, offered by providers such as Optimost and Offermatica, is typically used to evaluate web site layout, product placement, or the effectiveness of different promotional offers. For instance, if a merchant desires to know if its profits will be better by offering customers a discount of $10 on a $100 order or $20 on a $200 order, an A/B test might be appropriate. Traditionally, an A/B test provides one variation (the "A" purchase option) to a statistically significant sample of web site users and another variation (the "B" purchase option) to another statistically significant group of uses. (Note that the number of samples required for a statistically significant test is a function of the amount of performance difference between the "A" variation and the "B" variation, and is not generally known before the test.) The A/B test provider then measures the effectiveness or profitability of each option and determines if "A" or "B" (if either) results in better performance than a baseline option, typically the current offer.

Recently, A/B testing providers have expanded into multivariate testing where multiple variations on multiple dimensions of a purchase option may be tested simultaneously. For example, a web site might test two different site layouts and two different promotions simultaneously, resulting in four possible combinations being tested. If a merchant attempts to test many different choices of multiple variables simultaneously, this multivariate approach may require an unrealistic number of experiments to determine reasonable solutions. Although A/B and related multivariate testing can be used to optimize product prices, coupon offers, or shipping promotions, one known problem with A/B testing is that it treats variables as discrete choices rather than recognizing that some of these variables may be continuous, non-linear, or even discontinuous. It is reasonable to expect that a price-demand curve will often have these characteristics and may not be most efficiently and accurately found by A/B testing. For more detail on these problems, one can review "AB Testing: Too Little, Too Early?" by John Quarto-vonTivadar, Future Now, Inc., 2005, or U.S. Patent Publication 20040204979). As a further example of A/B testing limitations, consider a product that has a peak in sales at a price of $95, but has identical, lower sales at prices of $90 and $100. If the merchant attempts A/B testing at $90 and $100, the merchant will not see any performance difference and will never find the ideal price of $95 because that price was never evaluated. Another limitation of A/B testing to consider is that it only looks at the merchant's pricing and sales data. A merchant might more quickly identify the peak profit point of the price-demand curve by observing prices at which other merchants are offering the product. For the above reasons, there is a need in the art for a better price optimization technique than A/B testing.

Typically, comparison-shopping services do not process transactions directly (although Amazon and eBay are exceptions). Instead they forward prospective customers to the merchant's website. The comparison services receive revenue either 'per click' for directing customers to a merchant website or on a pay-per-click advertising model for ads that are shown alongside the merchant's price data on the comparison site.

Typically, online stores offer a single price per product regardless of from which referring site a customer arrived at the merchant's site. Therefore, if a merchant identifies that a competitor on a particular comparison site is selling a product for a lower price and matches or beats the offer, the merchant will change its price on its website, which is then the offered price for all customers, whether or not they discovered the merchant from the particular comparison shopping service where the merchant was trying to maintain price competitiveness. Thus the merchant may lower its profit margin for all orders of that product.

Further, prior art comparison-shopping services typically compare a single price per product per merchant. Because some sales channels, such as auction sites, support multiple prices such as buy-it-now, bid start and reserve prices, it may be more useful for the merchant to address separately these multiple types of pricing per product for the merchant's various on-line sales channels.

Further, many comparison-shopping services compare the product price but not the "total price" after including shipping charges to a certain destination. So two merchants may charge the same for the product but their shipping prices may differ considerably.

A key problem to solve is that merchants need to use comparison-shopping services to attract customers but need a better way to optimize their profit margin based upon the information available to the customer at the time of their shopping. For example, a merchant that normally sells a product for $200 may be willing to sell it for $150 to match a competitor on a comparison site. But the merchant only wants to offer the $150 price if the customer is at a shopping comparison site where competitors are offering a price such that $150 may be attractive. If other merchants on the comparison-shopping site are offering extremely low prices, the merchant may need also to determine whether its cost structure and overall selling strategy permit it to offer an equivalent or lower price. To do this requires more functionality, optimization logic, and tighter integration with e-commerce stores than is offered by existing e-commerce offerings.

Another problem that merchants face is knowing what prices the market will bear. For instance, a product selling well at a price of $12.50 may sell equally well at $12.75, but then not sell well at $12.99. Traditionally, brick and mortar merchants may estimate price and demand curves via 'test marketing' that offers different prices or products to customers of stores in different locales. However, this form of test marketing does not apply to e-commerce stores, because the location of the computers hosting the store has no relevance to the location of the customer.

A further problem is how a merchant should decide which of its products to sell on which sales channels, because the sales channels have different pricing models that include listing fees, insertion fees, final value fee at sale, upload fee, store fee, picture fee, fees based on category, credit card fee and transaction fee. Determining the true cost of a channel is important to merchants, since a product's total channel cost affects the effectiveness of the channel. The price of product is also a consideration; some channels' costs are prohibitively expensive for low-cost-low margin products while others are not effective for high-priced products. Another problem is when to re-list or when to abandon auction sales that did not result in finding a buyer. For example if sales channel "A" charges a flat rate of $2.00 for each product sold, then a merchant selling products with profit margins that are less than $2.00 will lose money using channel "A". However, if sales channel "B" charges 1% of product cost, then the merchant can sell those same products with a margin of less than $2.00 but greater than 1% of product cost on channel "B" and still make a profit.

It would be desirable to have tools to assist on-line sellers in selecting prices that improve sales and profitability.

SUMMARY OF THE INVENTION

A method for setting a price for a product sold online by a subject merchant and listed on at least one channel with other offerings of the same product by other merchants, comprising: accessing available subject merchant's sales status data for the product including sales trends originating from the at least one channel; accessing pricing rules for the subject merchant that cover sales originating from the at least one channel, wherein the pricing rules are responsive to the sales status data, if available, and determine whether or not a price adjustment should be explored for the at least one channel; if the pricing rules determine that the price should be adjusted, and that price information from at least one other merchant is needed, accessing price information of other merchant offers for the same product in the at least one channel; applying the pricing rules for the at least one channel to maintain or adjust the current product price at which the subject merchant offers the product on the at least one channel; and providing the maintained or adjusted price to a potential buyer.

BRIEF DESCRIPTION OF THE DRAWINGS

FIG. 4 shows in schematic form a table that may be used to organize some of the price discovery operations.

FIG. 5A shows a flowchart of an alternate logical flow for one embodiment of the Price Analyzer (PA) applying a sample set of pricing rules.

FIGS. 6a, 6b, and 6c are a PO.txt file that shows a database schema and variables for use by the PA module.

FIG. 8 is a database schema for the ProductSalesInventoryTrends table, used by the PA module to account for recent sales trends, inventory levels, seasonality, and product storage costs when determining which PA module goal is appropriate for a given merchant's product.

DETAILED DESCRIPTION OF THE INVENTION

Introduction

Figure 1:
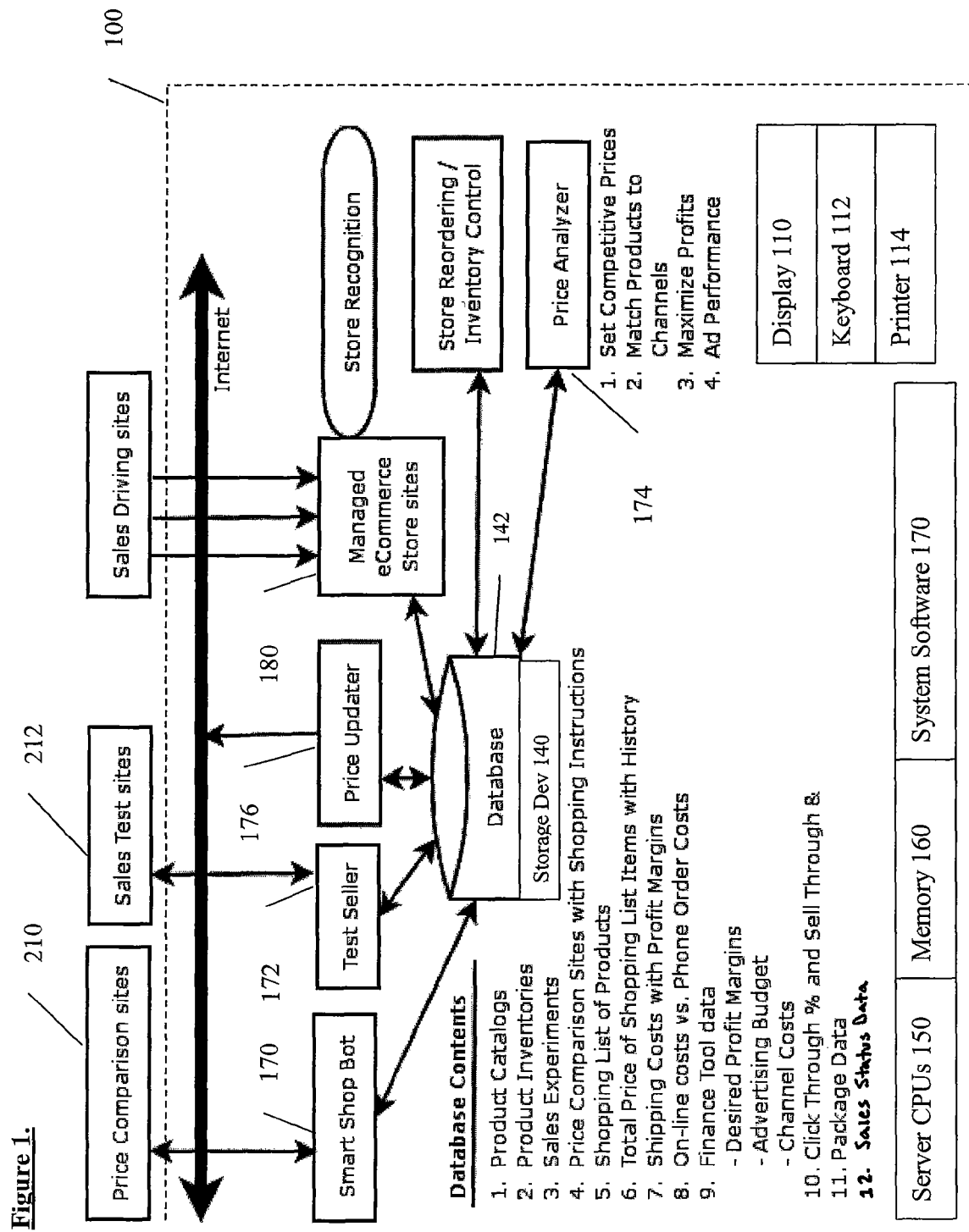
FIG. 1 is a high-level block diagram of an embodiment of the invention deployed at a typical merchant's ecommerce web site with $3^{rd}$ party sources of data identified.

The invention is an internet-based service and system offered to merchants that provides the following:
1. Obtains information from various comparison-shopping (or other) internet sites on how other merchants are pricing their products, focusing on "total price," including product, shipping and sales tax, and any quantity discounts, availability and package bundling.
2. Provides the means for a merchant to identify its lowest acceptable selling price (or profit margin) for a product or category of products (e.g., desired margins may change seasonally based on product category). Provides a means for establishing multiple prices per item for multiple channels using adaptive means and total sales channel costs.
3. Provides the means for directing the merchant's ecommerce software to alter the shipping price offered to a given customer who has been offered a favorable product base price to maintain a desired profitability level of the overall customer transaction.
4. Updates one or more comparison-shopping sites on behalf of the merchant to indicate a site-specific price that is competitive for that marketplace or channel.
5. Provides a means for when a user clicks on the merchant's offer at a referring shopping site to direct the merchant's ecommerce store to offer the customer the product at the price that was shown on that given shopping site. This is done by various tags, including one applied in an encrypted manner to a client side cookie (if available), such that a user cannot readily 'hack' or otherwise set his/her own price.
6. Provides, via its variable, site-specific pricing model, for some obfuscation to make it difficult for a competitor to know the typical price for which a merchant offers a product.

A competitor would need to look in multiple marketplaces to determine what it needs to do to compete.

7. Includes a means to identify from what referring site the user came to the merchant's site so the user will receive the same offer on a return visit to the site directly based on long term storage of IP referrer, cookie reference or user name.
8. Includes the means to adjust prices for products on channels based on the particular channel's profitability.
9. Access available sales status data, including sales trends measures (e.g., month to month or week to week sales increases/decreases), inventory level and aging, inventory storage costs and seasonality to determine if prices should be adjusted and to what extent.

Further, the present method and system optimize multiple prices and shipping charges per item per ecommerce sales channel simultaneously. The system can regularly or on command gather "total pricing" data including shipping, sales tax, base product price and possible alternative product prices, such as quantity discount, initial bid or buy-it-now prices, on a variety of products from a merchant's catalog from a number of existing ecommerce web sites of interest, and build a long term data store of pricing for further analysis. The system also can gather "market data" by selling a relatively small volume of inventory across multiple sales channels at varying prices, storing these "test marketing" data for further analysis. The system uses available data, multiple algorithms and user input rules to compute new, adjusted prices that match merchants' varying sales goals, such as maximizing profits, matching products to their most economical sales channels, gaining market share or optimizing advertising performance. The system may optimize profit margin by having channel specific pricing rules that consider total cost of a sales channel, including all fees such as listing, insertion, store, upload, picture, category, credit card and transaction in conjunction with the estimated price/demand curves. The system may optimize profit margin by considering sales channel characteristics and selling parameters controllable by a merchant other than price and costs, such as making an offer based on time of day, time of year and day of week that are unique to a channel, such as those that may be found on an auction site (for example, raise a price on Sundays, if that is the time that eBay has the most traffic).

Also, the system may determine an overall price adjustment factor for each channel to optimize profitability of each channel. This is especially useful in instances where there are not enough sales of a given product to achieve the statistical significance required to optimize prices for that particular product in that channel. In such cases, where statistical significance exists at the channel level, the system can determine price adjustments on a channel basis and then apply those adjustments to the individual products sold in that channel. For example, if a product normally sells for $100 but the system does not have a statistically significant sampling of sales of that product in a given channel, and if the system finds that other sellers' prices for the products via that channel are typically 5% lower than the merchant's prices, then the system may have the merchant offer the product for $95 through that channel until that channel's sales performance for that product can be better evaluated. Further, this choice of whether to use overall channel performance data or specific product performance data can be made on a product by product basis, determined by the statistical significance of sales of each product in a given channel. Finally, the system uses the new, channel-specific prices to update multiple sales channels used by the merchant for conducting business in conjunction with special sales channel recognition data that allows the merchant to pursue sales' goals.

Infrastructure

For the embodiments below, the following hardware/software set up may be used to implement the invention: Dual Intel Xeon-based server with at least 2 Gb of memory, and as system software, Windows 2000 Server, Microsoft SQL 2000, Internet Information Server 5.0, Microsoft's CDOSYS email component. A preferred embodiment would have multiple servers for database and application redundancy and isolation, and could also be built on other computing platforms.

Referring now to FIG. 1, the types of hardware and software within the computer system 100 may vary depending upon the implementation. For example, certain embodiments may have components, such as the display 110, keyboard 112, and/or printer 114, depending upon the specific capabilities of the system. In addition, the computer system 100 may support additional conventional functionality not described in detail herein, such as displaying images in a variety of formats, protecting the system from cyber-threats, allowing users to securely log into the system, and supporting administrative capabilities.

As is known in the art, the computer system 100 is adapted to execute computer program modules for providing functionality described herein. As used herein, the term "module" can refer to computer program logic or instructions for providing the specified functionality. A module can be implemented in hardware, firmware, and/or software components. Preferably, a module is stored on the storage device 140, loaded into the memory 160, and executed by server CPU's 150 in coordination with the above listed system software. As is the current state of the art, a typical ecommerce store is built around its long-term database storage 142. A typical ecommerce store keeps its product catalog and product inventory in its database, including costs and prices. The store's web pages then display products pulled from its database with all their associated data including shipping options, costs and margins. It may also keep its sales history in the database. Further, to the extent the store uses analytical tools to derive sales status data, such as various period-period sales, increases/decreases, industry comparative sales data, inventory levels, inventory aging, inventory duration predictions, inventory storage costs, seasonality definitions and categories, that data is in the database. FIG. 1 lists the types of data contained in the database 142. The invention system starts from this point.

As used in the present discussion, the term "product" may mean a good, such as an MP3 player, or a service, such as rug cleaning services, or a combination of goods and services, such as a computer and a maintenance services package. "Price comparison site" means any site where a user may see a listing of offerings of the same or substantially the same product offered by multiple merchants at different prices. This may be done in some kind of tabular form showing salient details for the different merchant offers or in simple lists of offered items (as in an auction site), with links that a customer may need to follow to find selling details.

Basic Components

In FIG. 1 the Smart Shop Bot (SSB) module 170 (which can also be called a robot or a crawler), is responsible for gathering total competitive prices from one or more ecommerce sites of interest where products of interest are sold.

These sites may include one or more price comparison sites 210 where the merchant has or is exploring a presence with one or more products. It may also include other sites that the merchant views as competitive for the products of interest and likely to be consulted by a potential purchaser from the merchant. A site or a collection of sites that are the subject of a common price setting cycle leading to the merchant providing a single price (or set of associated prices) for an item may be called a sales channel.

The merchant maintains in the database 142 not only a listing of sites that are part of the pricing analysis but also a shopping list that contains one or more identifiers of those products from the merchant's catalog for which competitive pricing information is sought. The sites of interest are stored in the database and maintained by the merchant and often include URLs. The sites of interest will normally include one or more price comparison sites 210, but may also include any site where competitive pricing information of interest may be found. As noted, the sites of interest may be partitioned into different channels for which a separate pricing analysis will be done. For example, a single comparison shopping site may be analyzed as one channel in one price setting cycle or multiple comparison shopping sites may be each separated into multiple channels (e.g., eBay or Amazon or Shop.com) and then pricing analysis and optimization may occur for each channel. Also, two or more comparison shopping sites, both of which are likely to be consulted by shoppers for a particular product, may be researched as one channel for a price setting cycle (For example, data for Shopping.com, NexTag and Shopzilla may be analyzed in aggregate as a 'comparison shopping' channel whereby pricing might apply identically to each comparison shopping channel.) Also, one or more individual store selling sites of competitive interest may be collected in one analysis or brought into an analysis of comparison sites.

In order to obtain total pricing from these sites the SSB module 170 needs to know how to shop on each site or to obtain a pricing data feed directly from the sites, whether the site is a comparison shopping or marketplace site (e.g., Amazon Web Services provides a pricing feed service) or a merchant site (e.g., an individual merchant may send the operator of the service direct data feeds or install a component into their web page to provide the merchant's pricing data to the service. Such implementation is detailed more fully in application Ser. No. 11/473,912 filed Jun. 23, 2006, titled "System for Competitive Internet Sales Analysis" which is incorporated herein by reference). When the implementation of the SSB 170 is a robot, the shopping instruction knowledge is maintained in the database as a collection of templates, rules and instructions. Persons and/or software that visit the site and extract information about the steps for finding a product of interest and that learn the steps for developing a total price prepare these templates, rules and instructions for each site of interest in one analysis. In some instances the templates, rules and instructions may need to be product-specific, if the nature of the product is that certain options have to be specified to develop the price. The templates, rules and instructions may need to consider, in addition to the product price, shipping and sales tax, quantity discounts, availability and package bundling.

Finding the proper product for price comparison is a known problem. See, e.g., U.S. Patent Publication No. 20040249643, which describes item codes, keywords and filtering codes associated with a merchant's products of interest and matching algorithms used with these to find competitive products at selling sites of interest. The focus is on keywords, such as new/used condition and keyword equivalents (e.g., 512 Mb=½ G). This is not always needed for most consumer products. Thus, the present system uses UPC/EAN/JAN codes to find identical products and filter out those with vastly different prices, which are likely not the same product.

The best foundation for a price analysis is to find the same item, identical in all respects. However, as used in the discussion herein, the "same" product may also be one with insubstantial differences, such as color or finish, that generally do not affect pricing.

As the SSB module 170 works its way through the shopping list, the competitive total price data for each merchant offering a product of interest is stored into the merchant's database. See FIG. 4, which shows a first table with the kinds of data fields that might be useful to capture pricing data for a particular product UPC 111222333444 that is not auctioned as offered by Sellers A-D on a particular comparison site or in a defined channel. This data defines a price range for an item in the particular channel that is to be analyzed for pricing. The data collected for a channel and an item includes an option for maintaining price history that may be varied at a seasonal level. Thus, an item may have a normal, in-season price and also a pre-season or end-of-season price, with each season defined by specific dates. Also, for an auction site, the SSB module 170 may identify and store a buy-it-now, bid start, reserve or other auction-unique price. FIG. 4 shows a second table with the kinds of data fields that might be useful to capture pricing data for a particular product UPC 111222333445 that is auctioned.

In FIG. 1 the Test Seller module 172, (TS), uses a list of ecommerce sales test sites 212 (e.g., eBay, Overstock.com, or the merchant's site) to place a small percentage of product inventory as selected by the merchant up for sale at various prices. The present invention solves the 'test marketing' problem for e-commerce stores by enabling a merchant to simultaneously offer different prices to different customers of a given e-commerce store. This allows for faster determination of a product's price and demand curve than existed before and allows the merchant to improve profit. In one embodiment, a range of prices of interest for a product are defined. The range of prices can be defined around a current price level, by profit margin, by viewing other merchant's prices for similar goods or by any other suitable means. Prices along the range of interest are randomly selected for testing and offered to different customers. One criteria for selection is that a price has been observed in use by other sellers. Another criteria is the utility of the price for constructing a price-demand curve when sufficient data is collected to perform curve fitting. A third criteria is creating an evenly spaced set of test prices over the range of interest.

The customers are tagged (as explained in greater detail below) so that when they revisit the site they are offered the same test price as before. The results of the customers buying a product and the particular price they were offered for that product are saved and used to generate a demand curve. The demand curve constructed is used to find an optimized or more favorable price point for the particular product. In addition to testing the market for price, the TS module 172 can test the market for other selling parameters that may be unique to a particular channel, such as what are the optimal times of day or days of week for ending an auction or how long should an auction last. The TS module 172 monitors and records the selling parameters of all sales of these tests in the database for further analysis, in particular the development of price and demand curves.

In FIG. 1 the Price Analyzer (PA) module 174 is shown and its primary functions listed. PA module 174 can periodically or on command be sent to analyze the price and market data obtained by the SSB and TS modules 170, 172 and then compute adjusted prices according to strategies and algorithms selected by the merchant. This module completes a price setting cycle that is initiated by the collection of the market data by SSB and TS modules 170, 172. These strategies and algorithms include generating a best competitive price based on the data and the merchants' goals. The merchant's objectives and constraints are embodied in a set of price setting rules, which may have a number of selling parameters that are adjustable across all products or are specific to only one product. For example, profit margin may be a parameter that is constant across all products, or there might be some product that would have its own profit margin objective. In some cases the merchant's objective is to reduce inventory and the PA module 174 computes adjusted prices in order to accomplish this goal. Some products will need to have prices for two or more seasons and profit objectives for two or more seasons. The seasonal periods themselves may be the same for certain products, e.g., a Halloween or Christmas seasonal items, or certain products may have their own unique seasonal period. These allow the pricing rules to be adjusted and applied differently based on the particular seasonal period defined for a product or product group. For example, the Christmas seasonal period might be different for a food product (where selling out may be a more important goal) than for a decorative item.

The PA module 174 factors in the desired profit margins, usually pulled from the merchants' database and maintained with a financial tool application (e.g., data from a database, Quicken, Excel, etc. . . . ). The merchant's pricing rules may be channel specific or may have channel-specific components. The PA module 174 can balance changes in price by adjusting both the product price and the shipping and/or handling cost charged to the customer. This is important, because the merchant may be willing to indicate a $140 price for an item that normally has a lowest price of $150 to entice the customer to go to the merchant's site, but then charge the customer $10 more than normal on the shipping/handling. This may be particularly attractive as a pricing rule for a comparison shopping site that does not include shipping in its price comparison. Thus, the PA module 174 will collect data on each site's pricing approach.

In some channels a merchant may not want to seek the lowest price position or may not want to attempt to meet the pricing of a particular competitor, known to use a loss leader strategy for certain products. In one embodiment, pricing rules will first consider the merchant's own sales status information, such as trends, inventory levels and other measures of past success or difficulty with sales and use pricing results for other merchants or channels only when the rules detect that a pricing change should be explored. For instance, if a merchant's sales have been increasing with a good profit margin, then the merchant may want to maintain or even raise prices even though a competitor is offering the same product at substantially below the merchant's price. Also, the pricing rules may provide for the merchant to detect cases of high inventory, high storage costs and or slow sales. In these cases the product may be put on a clearance price condition whereby the price may be lowered, possibly below the merchant's normal profit margin requirements, without regard to the competitive price landscape. Further, a merchant's pricing rules may include identification filters for removing a particular merchant (and especially the subject merchant) or particular unusual pricing from the competitive analysis or from the pricing comparisons. For example, the PA 174 may remove specific prices, adjusting competitive price statistics such as minimum, maximum, and average accordingly, whenever the system detects one or more prices for a product as being statistically anomalous. This might occur when a competitive price deviates from the other prices for a given product by more than two (for example) standard deviations. Also, the PA 174 may remove prices for specific competitors such as those that offer more than a specified percentage of products (that are in common with the merchant's products) at prices below the subject merchant's cost. Such cases call into question whether the competitive merchant's data is valid or if its business practices are designed for long-term profit. Additionally, the PA 174 may remove prices for merchants who have a sufficiently low (as determined by a threshold) feedback score in one or more competitive channels. As described above, the PA 174 implements a series of pricing rules that can improve the merchant's profitability by applying the rules against the merchant's own sales trends, competitive offering prices/trends of competitive merchants and channels, and customer demographics and even specific buying patterns. This may result in varied product total prices (includes prices, shipping/handling, & sales tax) per product per channel and even per customer.

For purposes of the PA module 174, the shipping charges that are available for adjustment may include the transport charge or any handling charge that is associated with the transport or any other amount that is part of the total price and is not either the base product price or taxes or other mandatory assessment that does not accrue to the seller. The amount of adjustment in the shipping charge may be guided by one or more goals configurable in the pricing rules. The pricing rules may specify that the transaction should simply charge shipping in an amount that brings a transaction at a reduced base price back to a particular profit margin or the shipping charge may directly include the amount subtracted to make the product base price competitive.

Figure 2:
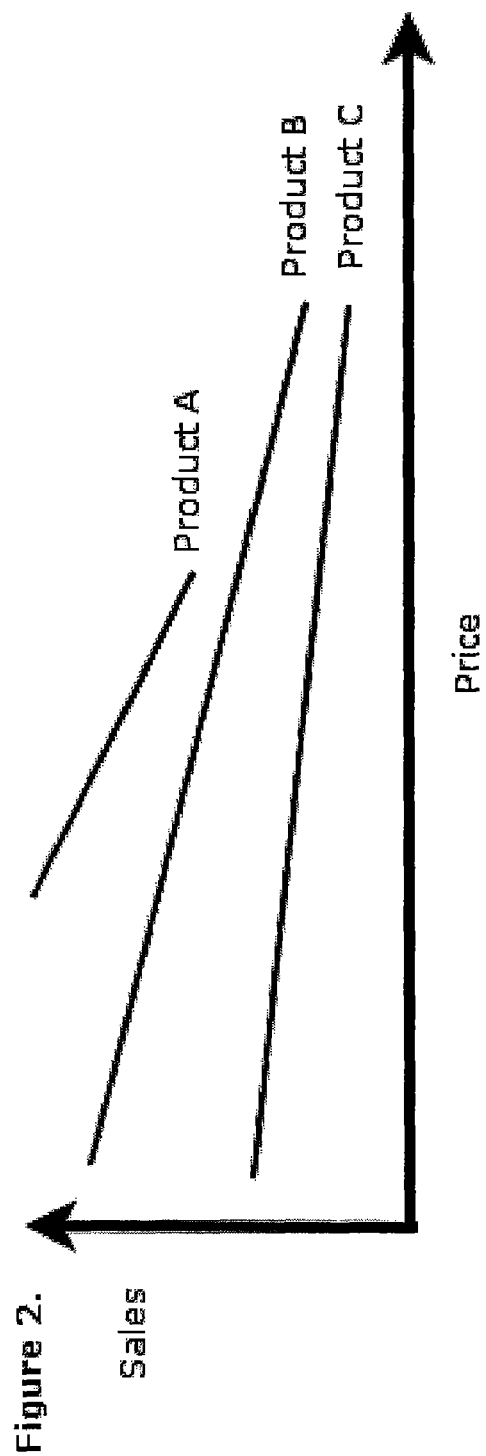
FIG. 2 is a graph of market data (sales vs. price) for a set of products displaying various linear behaviors.
Figure 3:
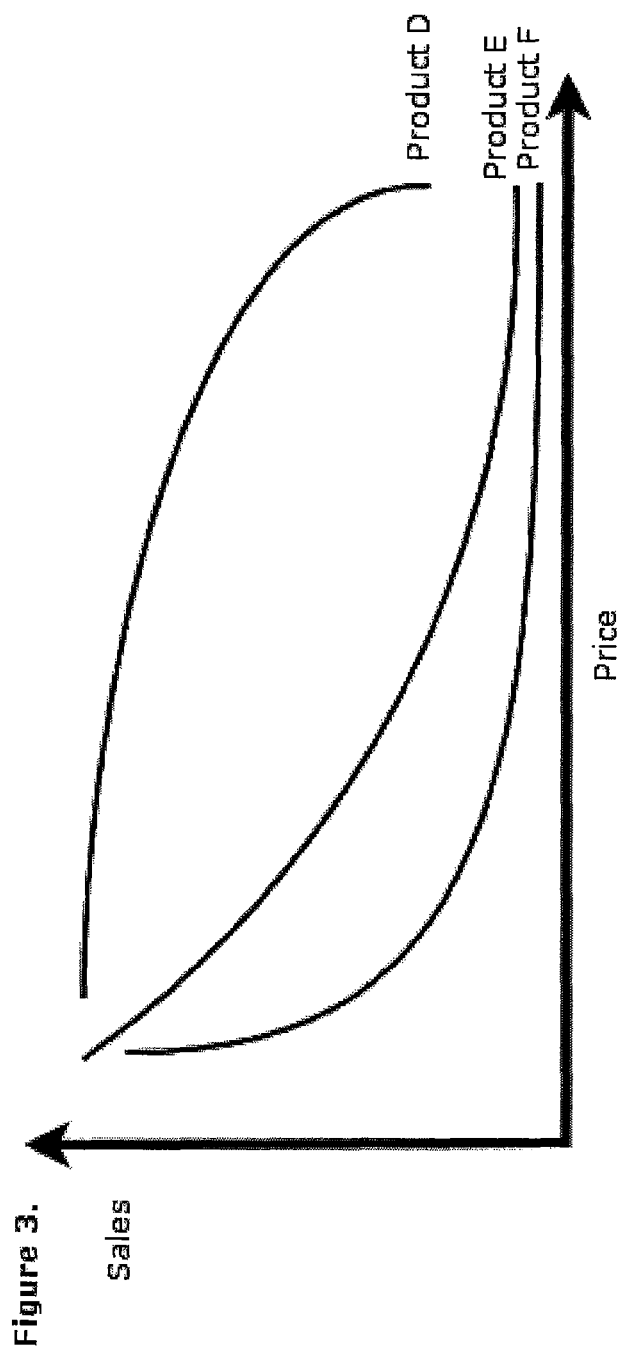
FIG. 3 is a graph of market data (sales vs. price) for a set of products displaying various non-linear behaviors.

The PA module 174 can analyze experimental results from the TS module 172 in order to determine the nature of the market for a product under research. This includes first determining if the price/sales market behavior for the product is linear, (as seen in FIG. 2, showing an example of data that might be obtained for three products A-C subjected to testing), or non-linear (as seen in FIG. 3, again showing an example of data that might be obtained for three products D-F subjected to testing). Once the overall market behavior over some useful price range is determined, then that behavior can be characterized.

A simplified case would be to model a linear regression demand curve of a given market's behavior for a product. This technique, commonly found in Microsoft Excel and SAS Statistics Software by the SAS Institute, can be used to determine the slope for linear behavior, (represented by variable M in the equation below).

$$\text{Sales}=M \times \text{Price} + \text{Offset}$$

For non-linear market behaviors the PA module 174 can characterize the Sales-Price curve as logarithmic or exponential, as well as setting a set of parameters, well known to those familiar with the art, that approximate those types of curves. Finally, the PA module 174 can select a price point based on market behavior and inventory, which will maximize profits for the merchant over a selected time period. The PA module 174 can view other merchant's prices for the same product as discovered by the SSB module 170 to help in the selection of the price point.

$$\text{Sales}=a \times (b^{-(c \times \text{Price})})$$

$$\text{Sales}=a \times \log_b(\text{Price})$$

Given sufficient sales volume, market testing data from TS 172 may be statistically significant to model price/sales behavior for a given product by channel, time of day, day of week, season, web site entry page, customer location, quantity discount schedule or other variables. TS 172 also has facilities for performing test marketing to develop demand curves that comprises developing two or more demand curves in which the pricing is held the same and other selling parameters are varied. These systems can be solved by those skilled in the art of non-linear data modeling and data mining using Neural Network function approximation, (as can be found in products from Neuro-Dimensions of Gainesville, Fla. and Neuralware of Carnegie, Pa.), Multi-Adaptive Regression Splines, Fuzzy Logic, Genetic Algorithms, Decision Trees and Reinforcement Learning algorithms. Thus, the present system can add sophisticated market research data to the price selling rules, by configuring logic and parameters derived from market research data into the pricing rules.

Further functions of the PA module 174 are dependant on the merchant's ecommerce store being more towards the state of the art, meaning that the merchant must understand and have built the infrastructure to track money spent on advertising specific to certain sales channels, understand the costs in selling products both by on-line methods and phone orders, maintaining statistics pertaining to click-through percentages, sell-through percentages and the costs associated with each. With this infrastructure in place the cost constraints portions of price setting rules can be articulated far more effectively than if only the base product cost is known and the further costs of any given sale are not traceable. With channel specific information, the PA module 174 can then match products in the merchant catalog to their best available sales channels, as well as track advertising budget and performance utilizing OLAP (On-Line Analytic Processing) and hypercube database technologies, e.g., the PowerPlay software from Cognos Incorporated of Burlington, Mass. Again the price setting rules can be configured to incorporate complex calculations or cost constraints that vary by channel and by recent sale data from the channel.

As seen in FIG. 1, the Price Updater (PU) module 176 can be triggered by the PA module 174 or on a merchant command to push updated price data out to the appropriate sales channels. This module is fairly standard to those familiar with the art, but is indispensable in implementing the price analysis results and achieving the merchant's goals. This can be implemented via database updates followed by generation of XML or CSV files which are then copied via FTP protocol to remote machines. Pursuing the merchants' goals on their self-managed ecommerce stores 180 is directly accomplished by the PA module 174 in updating the catalog database, or a merchant can choose to manually intervene through the PU and PA module controls.

Figure 5:
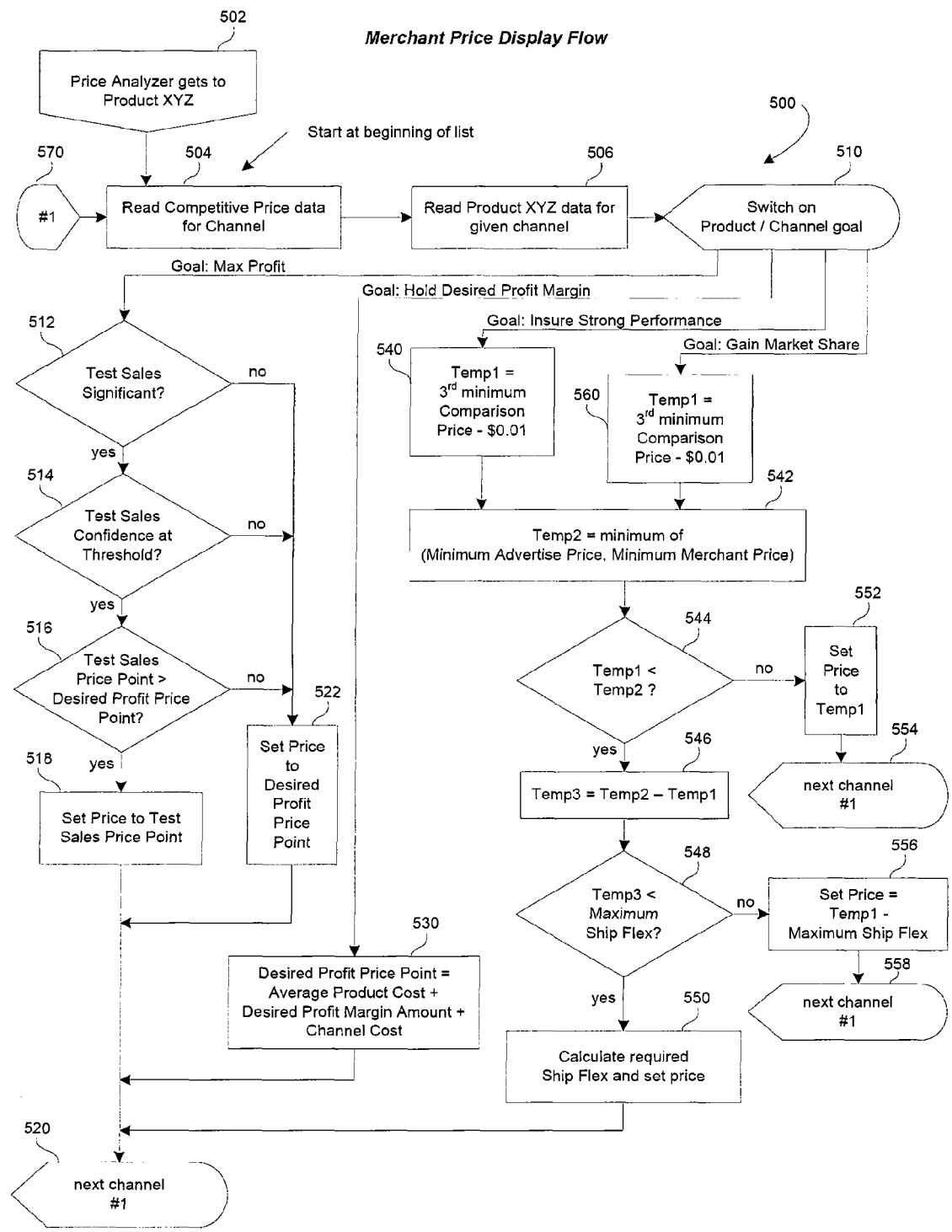
FIG. 5 shows a flowchart of the logical flow for one embodiment of the Price Analyzer (PA) applying a sample set of pricing rules.

FIG. 5 shows the general flow of analysis for an example of a set of price setting rules, which assumes that there is data in the database 142 for the products and channels to be analyzed, including the various parameters necessary to define the price setting rules. The analysis process begins with the PA module 174 progressing to analysis of a particular product XYZ at step 502. The PA module 174 reads the comparative price data from a particular channel at step 504 and reads data for product XYZ at step 506. The PA module 174 then may take one of several paths from selection switch 510, based on the price setting goal that is predefined in the price setting rules for Product XYZ in the particular channel or selected by the user if the goal is selectable at the time of analysis. If the goal is to maximize profit, then from switch 510 the module proceeds to step 512 where it determines if the test sales have been significant. If that is the case, it proceeds to step 514 where it determines if the test sales have achieved a predetermined confidence level by some statistical measure. If this is not the case, the PA module 174 proceeds to step 522 where it sets the price at the desired profit price point and moves to step 520, which sets up an analysis of the next channel by going to entry point #1 at 570. If the predetermined confidence level is met at step 514, then the PA module 174 tests at step 516 to see if the test sales price point as determined exceeds the desired profit price point. If that is not the case, then the PA module 174 again proceeds to step 522 where it sets the price at the desired profit price point and moves to step 520. If the test at step 516 is met, then at step 518, the PA module 174 sets the price to the test sales price point and again moves to step 520. The test sales price point may be one derived by the TS module and its computations of various pricing curves.

If the goal defined in the price setting rules is to hold to a desired profit margin, then the PA module 174 proceeds to step 530 where the desired profit price point is computed from the average product cost plus the desired profit margin amount and the channel cost, all of which may themselves be based on other calculations. The PA module 174 then moves to step 520, which sets up an analysis of the next channel.

If the goal defined in the price setting rules is to hold to insure strong performance, then the PA module 174 proceeds to step 540 where it computes a Temp1 value based on the third minimum comparison price less a small amount, in this case $0.01. Alternatively, Temp1 in step 540, may be any other function of competitive prices deemed to be likely to make the merchant's price competitive for a given product. For example, Temp1 could be the average competitive price after removing outlier prices that were more than 1.5 standard deviations from the average competitive price. Alternatively, if the goal is to gain market share, Temp1 in step 560 might be calculated in a number of different manners to meet a given merchant's business goals. For example, in step 560 Tempt1 can be $0.01 less than a minimum comparison price. The PA module 174 then proceeds to step 542 where it computes a Temp2 value based on the minimum of the minimum advertised price or the minimum merchant price parameters. At step 544, the Temp1 and Temp2 values are compared. If Temp1 is not less than Temp2, then at step 552 the price is set to Temp1 (i.e., no price minimum constraints were encountered) and the logic proceeds to step 554 to return to entry point #1. If Temp1 is less than Temp2, then at step 546, Temp3 is computed as the difference of Temp2 and Temp1. At step 548, Temp3 is compared to a value defining the maximum flexibility for adjusting shipping charges (Maximum Ship Flex). If this test at step 548 is not satisfied, then at step 556 the price is set at Temp1 less the value defining the maximum flexibility for adjusting shipping charges and at step 558 the PA module 174 proceeds to entry point #1 to address the next channel. If the test at step 548 is satisfied, then the PA module 174 calculates at step 550 the required adjustment in shipping price to offset the reduction in base price and then at step 520 proceeds to address the next channel. Additionally, there may be restrictions placed on how frequently prices may be changed. For instance, the price within a given channel for a specific product may be held steady for at least seven days to increase certainty of sales trends before making further price adjustments.

FIG. 5A shows the general flow of analysis for an alternate example of a set of price setting rules, which assumes that there is sales status data in the database 142 for the products and channels to be analyzed, including the various parameters useful for analysis by the price setting rules. The analysis process begins with the PA module 174 progressing to analysis of a particular product XYZ at step 502 (see FIG. 5). The PA module 174 reads the data for product XYZ at step 506. In this alternative, the competitive price data for the channel may only be accessed later, contingent on an initial analysis of sales status data. The PA module 174 reads the product sales status data for product XYZ at step 507, such as sales trends and the product inventory levels and relevant storage costs for product XYZ at step 508. The PA module 174 then may take one of several paths, based on the price setting goal that is predefined in the price setting rules for Product XYZ for particular sales trends, seasonality, inventory levels and storage costs or selected by the user, if the goal is selectable at the time of analysis at step 509.

Although many similar calculations are possible, referencing FIG. 8, a high inventory level may be flagged if MonthsInventory is greater than 12 (as an example) months. MonthsInventory is calculated so as to account for seasonality changes and new item listings, thereby preventing incorrect decisions to put an item on clearance. Thus, it is not appropriate to put Christmas decorations on clearance in September just because they have not sold for a few months, nor is it appropriate to put a brand new product on clearance because there were no historical sales. In this example, a low inventory level may be when MonthsInventory is less than 2 months and 'normal inventory' may be between 2 and 6 months of inventory on hand. Between 6 and 12 months of inventory may be considered moderately high.

Similar to inventory levels, sales trends may be calculated by examining if sales during the most recent month (MonthlySalesMoneyMo) were higher or lower than sales during the most recent quarter. (MonthlySalesMoneyQtr).

If product XYZ has high inventory levels and the sales trends are down, product XYZ is put on clearance and a lower profit margin requirement is used (possibly sold at a loss) at step 511. The price of product XYZ may be set to the price of the lowest competitor or lower than the lowest competitor. If there are also high storage costs (from FIG. 8, this would be StorageCostPerItemPerYear*QtyOnHand in excess of a merchant or service operator specified threshold), the price may be set even lower. If product XYZ has low inventory levels and the sales trends are up, the price of product XYZ may be increased (for example by a factor of 2%) and competitive prices may be ignored at step 513 or used only to determine if the price adjustment is too extreme for that channel. If product XYZ has normal inventory and sales trends are up, step 515, the PA 174 proceeds to step 510 of FIG. 5A and sets the goal to ensure strong performance. To achieve "Ensure Strong Performance" the system may implement a downward price adjustment so that the product appears in the cluster of lowest prices or merely to ensure that pricing remains below an average price found for the channel. The system may also adjust prices to maintain a preferred ranking such as $3^{rd}$ from the lowest offering price.

If product XYZ has normal inventory and sales trends are down, step 517, the PA 174 proceeds to step 510 of FIG. 5A and sets the goal to gain market share. This would typically mean adjusting the price to one of the lowest in the channel. If there are other inventory and sales trends as well as storage costs that do not meet one of the above described criteria, step 519, the PA module 174 proceeds to step 510 of FIG. 5A and may take one of several paths, based on the price setting goal that is predefined in the price setting rules for Product XYZ in the particular channel or selected by the user if the goal is selectable at the time of analysis. The examples shown above and in FIGS. 5 and 5A are not the only possible embodiments but are intended to be illustrative of the methods by which merchant sales trends and competitive price data may be used together to automatically adjust and/or optimize prices.

FIGS. 6a, 6b, and 6c are a PO.txt file that shows a database schema and variables for use by the PA module in the analysis shown in FIG. 5. Among other things, FIGS. 6a, 6b, and 6c show any relevant formula and the basis or origin for the variable.

FIG. 1 shows Sales Driving Sites 214, which are any web site where the merchant may have bought advertising for the merchants' self managed stores 180 such as a local portal, Ebay, Amazon, or a search engine. The self managed stores 180 are the referral targets for Sales Driving Sites 214. The system uses a variety of methods well known to those familiar with the art that allow the self managed stores to recognize and identify traffic from the Sales Driving Sites and offer the appropriate total price for that sales channel using referrer IP's, cookies or user name logins.

Figure 7:
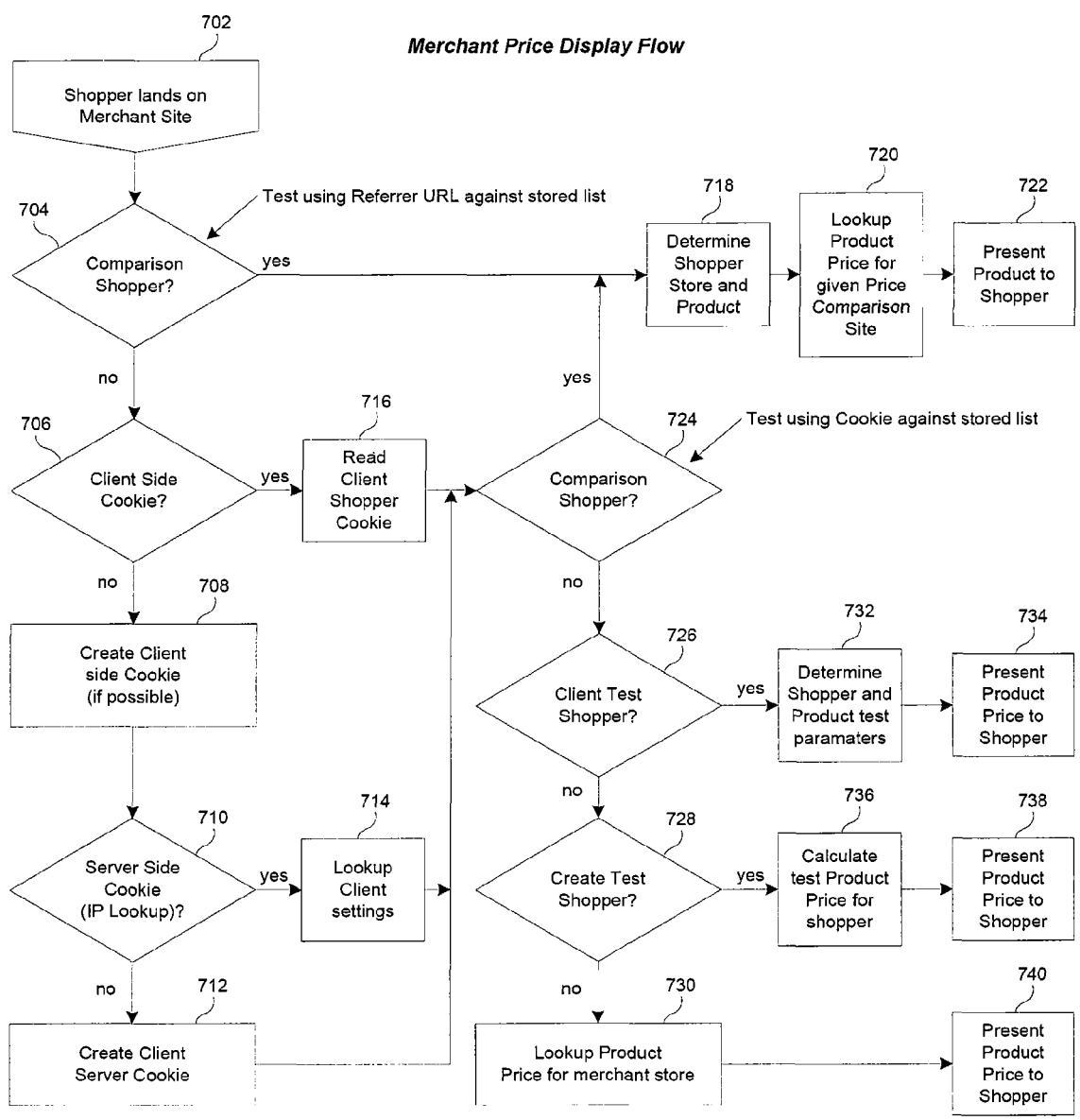
FIG. 7 shows a flowchart of the logical flow relating to identifying any tags applied to shoppers for managing price differentiation and applying tags to identify shoppers.

FIG. 7 shows an example of logic that may be used with an incoming shopper to determine what price that shopper will see. Generally the goal is to provide the shopper the same price they have seen previously, usually on another site, such as a price comparison site. In some instances the shopper has been the subject of a market data test from TS module 172. In that case, the shopper should be presented the same price as was set for the test. In other cases, the shopper has no price history. In that case, the shopper can be treated as a regular shopper arriving for the first time at the site, or can be made into a test shopper who is offered a price based on a test marketing design. FIG. 7 shows each of these possibilities.

In one scenario, it is desirable, if possible, to label the shopper with a tag. For purposes of this invention the term tag includes creating a client side cookie as well as a cookieless session which appends a session ID to every URL or to hidden forms in HTML pages.

Initially the shopper lands on a merchant site, step 702. The system determines whether or not the shopper is from a comparison site, step 704. The system determines this by using a referrer address from the shopper's browser. Although not shown in FIG. 7, if the referrer address from the shopper's browser says that the shopper is from a certain comparison site, the system applies a tagging module to 'tag' the shopper by one or more of the following: a) saving a cookie on the shopper computer (which can be encrypted, to prevent it being hacked); b) saving a setting on server indicating that the computer from shopper's IP address came from XYZ shopping site; and c) if the shopper has an account on the website that is doing the price analysis (this case is not shown in FIG. 7), the system can save data showing that that shopper came from a given site. (It is possible that a returning shopper does not go to the analysis site directly but still comes from a comparison site). When the shopper returns, the system has all of these means to identify them.

The user could only hack the cookie of case (a), because cases (b) and (c) involve data stored in the servers of the system. If the hack is attempted with the client side cookie of case (a) because of the encryption the system will most likely not recognize it as a valid tag and will ignore it. Then the system attempts to look the shopper up via data stored in the server in case (b) or (c). If all of that fails, it's as though the system has never seen the user before. The hacker shopper will not get any special treatment.

FIG. 7 contemplates that certain shoppers with no history will be selected by the Test Seller (TS) modules 172 to be part of a test. The TS module 172 is a component that provides unique (or near unique) prices on one or more products to identified Test Shoppers. A Test Shopper is someone that the system has identified to show prices that may be different from the merchant's standard price. The system may be set up to have every shopper in an interval or at a site be a Test Shopper, or it may be that just a certain percentage of shoppers are Test Shoppers, or just shoppers in specific geographic locations, etc. (Companies have created databases of geography by IP address range. For example, http://www.geobytes.com/IpLocator.htm. This information can also be used to determine whether a shopper has a slow speed or high speed internet connection). If the system cannot identify the location, then it can still use the TS module to optimize for the best price overall. The TS module can optimize for prices within a geographic region and may determine that to maximize profitability, the merchant can charge more to certain customers e.g. those in Beverly Hills, as compared to customers in rural Arkansas. Whereas this is done in brick and mortar stores all of the time, it generally has not been applied to web sites before. The geographic targeting is an option not a requirement of the system.

Referring again to FIG. 7, if the system determines that a shopper is from a comparison shopping site, step 718, it looks up the price for the given price comparison site, step 720, and shows the price that was submitted to that comparison shopping site, step 722. But if the shopper reached the website from another location, any price is fair game. The system checks to see if the shopper has a client side cookie, step 706. If the shopper does have a client side cookie, the client side cookie is read, step 716. If the shopper does not have a client side cookie, the system attempts to create a client side cookie, step 708. The system then checks to see if the shopper has a server side cookie, for example a saved IP address, step 710. If the shopper has a server side cookie, the shopper's settings are read, step 714. If the shopper does not have a server side cookie, the system attempts to create a server cookie for the shopper, step 712.

Once a shopper cookie has been read, step 716, or created step 708, 712 the system checks to see if the shopper is a comparison shopper, step 724. If the shopper is a comparison shopper the system proceeds to step 718 as discussed above. If the shopper is not a comparison shopper, the system proceeds to step 726. The system checks to see if the shopper is a Test Shopper, step 726. If the user is a Test Shopper (having been so designated by TS module 172) the system uses the cookie/tag applied to determine who the shopper is and product test parameters used, step 732, and then sends them the same price TS module 172 would have offered to the user before, step 734. If the user is not recognized as either coming from a comparison shopping site or as a Test Shopper, the system can determine if it wants the user to be a Test Shopper, step 728. If the system wants the user to be a Test Shopper, it generates a unique tag and set of pricing for the user via the TS module 172, step 736 and presents it to the shopper, step 738. If the system does not want the shopper to be a Test Shopper, the system reads the product price for the merchant store, step 730, and presents the product price to the shopper, step 740. The concept is an online store where two persons shop at the same time but see different prices. When each returns, that shopper sees the pricing that he/she saw before. This helps a merchant to determine the 'right price' to offer products to maximize their profit/business goals.

A shopper may be provided a unique or near unique tag. For example, if the customer does not permit a unique id to be stored in a browser 'cookie', the system can use the shopper's IP address for the tag. This is an example of a near-unique tag, because it is possible that more than one shopper will share the same IP address.

Detailed Description of Specific Implementation Scenarios:

Given the structure of one embodiment of the inventive system above, the following are more detailed implementation scenarios.

1) Price optimizer that varies shipping charges as part of overall pricing.

Because actual shipping costs for modern ecommerce systems can be calculated in real-time, merchants typically add a handling cost to the shipping charge (a fixed amount or a percentage) offered to a customer. In the present inventive system, this handling cost can be increased in some situations to allow a merchant to present a lower product price while still meeting the merchant's profitability targets.

Preferred Embodiment of Shipping Optimization:

a) The merchant sets Desired Sales Price (DSP) of the item. This will be done for all items merchant is selling and will typically be stored in a database such as Microsoft SQL 2000.

b) In formulating the price setting rules, the merchant may set a minimum allowed profit margin (typically a percentage but could be a monetary amount). This can be used to calculate a minimum sales price (MSP). Merchant may also set MSP directly. MSP may be limited by minimum advertised price (MAP) as specified by the manufacturer of the product. The cost of the specific sales channel (e.g., for eBay, the listing, final value, and PayPal transaction fees, percent of items listed by that merchant in that category or of that specific type that sell through the given channel) may be included as part of the calculation of MSP. For example, if only 30% of the listings for that type of product are selling through eBay and eBay has a 2% listing fee plus a 3% final value fee plus a 3% PayPal transaction fee, and the merchant wants a minimum 20% profit, then the base MSP should not be less than (2%/(30% success rate)+3% final value+3% PayPal+20% desired profit=32.66%) more than the cost of the unit for the seller to meet their minimum profit margin. Note, the success rate may be estimated over time and periodically updated by the Price Analyzer module 174 using historical performance of the product or products of a similar type or category. Also, the Price Analyzer module 174 may calculate the success rate as a function of other factors such as seasonality, day of week, or time of day. For this reason, the pricing rules are set up with easily varied parameters so that as data is collected the parameters can be updated.

c) If a given comparative pricing engine does not display "total costs" (may not be possible or accurate for many comparison pricing engines because shipping usually varies on destination zip code), then the system may be able to vary its shipping price for that channel to obtain better placement on a given comparative pricing engine.

d) First, the PA module 174 addresses desired placement in the pricing range based on no change in shipping price. If the merchant cannot obtain a desired placement without violating a gross profit margin parameter of the pricing rules, the PA module 174 decreases the price below the MSP for that item up to an adjustment constant (say 20% of the MSP) and increases the shipping costs by 20% of the MSP for that channel. The PA module 174 will only shift enough of the total cost of the transaction from the product price to shipping to meet the placement target for that comparative pricing engine. For instance if the merchant prefers a number two placement (next lowest price) on the listing service and that can be met with a 10% adjustment from product cost to shipping, then only adjust both values by 10%. Whatever prices are offered via a certain channel are stored in the merchant's price database system for that channel for future lookup.

e) When a user comes to the merchant's web site as referred by that comparison-shopping or marketplace channel, the merchant's site will present the user with the corresponding product price and shipping adjustment factors for that channel. The store can track the user by the referrer address initially and then for future visits by the user's IP address or user account (a lookup table would be stored in the merchant's database) or a cookie on the user's computer. This can be implemented by anyone skilled in the art of e-commerce web site development as seen above in FIG. 7.

2) Variable total pricing per product per channel:

To obtain data needed to know the price and demand curve for a given product a merchant may want to conduct 'test marketing'. This aspect of the invention is most valuable when there are many units of a product that are being sold. Someone skilled in the art of statistics, such as using normalized z-scores against one, two or three sigma of standard deviation to insure a desired level of statistical confidence, can readily determine the number of sales required for this approach to be beneficial.

Using the infrastructure built for the shipping optimization above allows the inventive system to offer different prices for products and shipping per advertising/comparison-shopping/marketplace channel based on the profitability for that channel. Channel profitability can be dependant on channel cost as a percentage of product sale or a flat rate. This infrastructure can also be leveraged to offer multiple prices/shipping of the same product in the same channel simultaneously. This can take two forms:

a) Multiple prices for the same product based on user entry point or random deviations to the "total price".

A merchant using the inventive system may vary the "total price" (including pricing/shipping costs) based upon the user's entry point to the web site. For example, all users might be presented with the DSP plus or minus a factor (say 10%) of the DSP. The tracking in 1 (e) above enables consistency in showing the user the same price over time.

Alternatively, the system can optimize total price by varying pricing over more than just a given price. For instance, if there is enough sales volume and randomness with respect to page/entry point vs. time-of-day vs. total price for a given product (product, shipping costs, tax), then the system may gather enough statistically significant data for the PA module 174 to alter the DSP for a given combination of sales channel, product, time of day, and page on the site. Time of day is one example in which other selling parameters, such as day of week, geographical location of the buyer or the buyer's can also be accounted for. For example, if customers are willing to pay a higher "total price" if they search on the item directly from a merchant's store instead of linking to the product from Froogle or finding it in the 'Gift Ideas' section of the merchant's site, then the system could identify this and adjust the pricing accordingly.

b) Multiple prices for consignment or auction channels (e.g., Overstock, eBay) that expire at different times In another embodiment, the TS module 172 may determine price sensitivity by automatically posting overlapping for-sale listings for a given product that expire at different times and with different Reserve Price or Buy-It-Now price amounts. Thus, at least a portion of the test sales listings are simultaneous.

Buyers of auctions are often looking for a 'deal'. So with this in mind, there are two goals of this approach:

1) Maximize profitability of the auctions themselves.

By testing many different auctions, the TS module 172 collects data useful to the PA module 174 in determining the best Day of Week, Buy-It-Now price, Initial Listing, Shipping & Handling Fee, Time of Day, Auction Length and Reserve Price for a given product to maximize profitability. One knowledgeable in the art of data modeling, as described earlier, can implement the PA module 174 to optimize these variables with linear or non-linear optimization methods. Then future auctions will likely be more profitable.

2) Maximize cross sell opportunities of an auction to other 'Store Inventory' auctions The merchant may want to offer a few of their products available via an auction to inexpensively drive sales of other products. For example, due to the high listing costs on some channels like eBay, it is likely advantageous for a merchant to only list a fraction of its products as an auction or Buy-It-Now listing. The pricing rules of the system may limit posting to only the top selling 10% (for example) of the merchant's products. Or, the merchant may specify to limit listings to only the top 10% of those products with high cross-selling statistics. As one example, people that buy a certain product are more likely to also purchase a companion or accessory product. As another example, using techniques such as collaborative filtering may find that people that buy Product "A" have a certain taste and sensibility that are in common with those people that purchase Product "B". Thus, advertising a product via a higher-priced Buy-It-Now or Auction listing may lead to sales of 'Store Inventory' items that have a lower listing cost to the merchant. The above description applies to eBay listings but could equally well apply to other auction or store marketplace channels. The merchant may also restrict the advertising costs to a given channel to a specific budget.

From the above description and drawings, it will be understood by those of ordinary skill in the art that the particular embodiments shown and described are for purposes of illustration only and are not intended to limit the scope of the present invention. Those of ordinary skill in the art will recognize that the present invention may be embodied in other specific forms without departing from its spirit or essential characteristics. References to details of particular embodiments are not intended to limit the scope of the invention.

What is claimed is:

1. A computer system-implemented method for setting a price for a product sold online by a subject merchant using the internet and listed on at least one internet site sales channel with other offerings of the same product by other merchants, comprising:

accessing from a database available subject merchant's sales status data for the product including sales trends originating from the at least one channel;

implementing in a price analyzer module pricing rules with parameters adjustable by product and specific sales channel;

accessing implemented pricing rules for the subject merchant that cover sales originating from the at least one channel, and responsive to the available sales status data and such implemented pricing rules, determining whether or not a price adjustment should be explored for the at least one channel;

accessing using a robot module price information of at least one other merchant offer for the same product in the at least one internet site sales channel;

upon determining a price adjustment should be explored, using the price analyzer module and the price information of the at least one other merchant offer, applying the pricing rules for the at least one channel to maintain or compute an adjustment to the current product price at which the subject merchant offers the product on the at least one channel; and providing the maintained or an adjusted price via the internet to a potential buyer as an offer of the subject merchant.

2. The method of claim 1, further comprising: responsive to a base price adjustment that would reduce the total product price so as to violate a specified profitability goal, increasing the shipping charges with which the merchant offers the product with the base price adjustment on the channel.

3. The method of claim 2, further comprising increasing the shipping charges with which the merchant offers the product by an amount sufficient to satisfy a specified profitability goal.

4. The method of claim 2, further comprising increasing the shipping charges with which the merchant offers the product by an amount sufficient to offset a base price reduction resulting from application of the pricing rules.

5. The method of claim 1, wherein the step of accessing price information comprises determining whether other merchants on the channel offer the same product and, using stored shopping rules and the robot module, calculating a product price, a shipping price and total price for a plurality of merchants on the channel that offer the same product.

6. The method of claim 1, wherein the subject merchant's pricing rules include a selectable minimum profitability criterion.

7. The method of claim 1, wherein the subject merchant's pricing rules perform a filtering analysis and include a rule configurable to remove a particular seller's offering from a competitive analysis for at least one product.

8. The method of claim 1, wherein the subject merchant's pricing rules include a rule that applies cost analysis for the costs involved in making a sale via a sales channel that has one or more of the following cost elements: listing fees, insertion fees, final value fee at sale, upload fee, store fee, picture fee, fees based on category, credit card fee and transaction fees.

9. The method of claim 1, wherein the subject merchant's pricing rules include a rule configurable to embody solutions to demand curve analysis based on demand curves derived from the subject merchant's test marketing by simultaneously offering different prices to different customers of a given e-commerce store.

10. The method of claim 1, wherein the subject merchant's pricing rules include a rule configurable to embody selecting product offerings with offering factors selected from the group consisting of: sales channel, product, time of day, and page placement of an offering on a site.

11. The method of claim 1, wherein the step of accessing price information of at least one other merchant comprises discovering more than one price for at least one product of that at least one other merchant and the step of applying the pricing rules to compute an adjustment to the current product price comprises applying a pricing rule to adjust for the subject merchant more than one price associated with the subject merchant's offering for the at least one product.

12. The method of claim 1, further comprising the step of performing test marketing to develop demand curves for use in the implemented pricing rules, wherein the test marketing comprises simultaneously offering different prices to different customers of a given e-commerce store.

13. The method claim 12, wherein the step of performing test marketing to develop demand curves comprises developing two or more demand curves in which the pricing is held the same and other selling parameters are varied.

14. The method of claim 1, wherein the implemented pricing rules include an overall adjustment factor for the at least one channel to optimize profitability of a plurality of products the subject merchant offers in the at least one channel.

15. The method of claim 1, wherein the subject merchant's sale status data for a product include at least one of inventory level, storage costs, and sales trends.

16. The method of claim 1, wherein the implemented pricing rules provide for an adjusted price is lower than the merchant's normal profit margin requirements.

17. The method of claim 1, wherein implemented pricing rules provide that if the subject merchant's sales status data for the product show that there is high inventory for the product and that sales trends are down, the product is put on clearance and a lower profit margin requirement is used.

18. The method of claim 1, wherein implemented pricing rules provide that if the subject merchant's sales status data for the product show that there is low inventory for the product and that sales trends are up, the price of the product is increased.

19. The method of claim 1, wherein implemented pricing rules provide that if the subject merchant's sales trends for the product show that there is normal inventory for the product and that sales trends are up, the price is adjusted in order to ensure strong performance.

20. The method of claim 1, wherein implemented pricing rules provide that if the subject merchant's sales trends for the product show that there is normal inventory for the product and that sales trends are down, the price is adjusted in order to gain market share.

21. The computer system-implemented method for setting a price for a product sold online by a subject merchant using the internet of claim 1, wherein the product is sold on two or more channels and the steps of accessing sales status data, accessing pricing rules, accessing price information and applying the pricing rules are performed for the product in two or more channels and the pricing rules for the two or more channels cause the price analyzer module to maintain or compute an adjustment to the current price differently in the two or more channels.

22. The computer system-implemented method for setting a price for a product sold online by a subject merchant using the internet of claim 21, wherein the pricing rules of each of the two or more sales channels are configured with the fees of the respective sales channels.

23. The computer system-implemented method for setting a price for a product sold online by a subject merchant using the internet of claim 21, wherein the pricing rules of each of the two or more sales channels are configured with the total cost of sales of the respective sales channels.

24. The computer system-implemented method for setting a price for a product sold online by a subject merchant using the internet of claim 21, wherein the pricing rules of each of the two or more sales channels are configured with the times when the most traffic comes to the respective sales channels.

25. A data processing system for setting a price for a product sold online by a subject merchant using a site on the internet and listed on at least one internet site sales channel with other offerings of the same product by other merchants, comprising:

a module executing on a processor and accessing from a database available subject merchant's sales status data for the product including sales trends originating from the at least one channel;

a module implementing pricing rules with parameters adjustable by product and specific sales channel;

a module executing on a processor accessing implemented pricing rules for the subject merchant that cover sales originating from the at least one channel, and responsive to the available stored sales status data and such implemented pricing rules, said module determining whether or not a price adjustment should be explored for the at least one channel;

a robot module executing on a processor accessing price information of at least one other merchant offer for the same product in the at least one internet site sales channel;

a module executing on a processor and responsive to a determination that a price adjustment should be explored and further responsive to the price information of the at least one other merchant offer, applying the pricing rules for the at least one channel to maintain or compute an adjustment to the current product price at which the subject merchant offers the product on the at least one channel; and a module executing on a processor for providing the maintained or an adjusted price via the internet to a potential buyer as an offer of the subject merchant.

26. The data processing system for setting a price for a product sold online by a subject merchant using a site on the internet of claim 25, wherein the product is sold on two or more channels and the modules accessing sales status data, accessing pricing rules, accessing price information and applying the pricing rules are performed for the product in two or more channels and the pricing module for applying price analyzer rules for the two or more channels maintains or computes an adjustment to the current price differently in the two or more channels.

27. The data processing system for setting a price for a product sold online by a subject merchant using a site on the internet of claim 26, wherein the pricing rules of each of the two or more sales channels are configured with the fees of the respective sales channels.

28. The data processing system for setting a price for a product sold online by a subject merchant using a site on the internet of claim 26, wherein the pricing rules of each of the two or more sales channels are configured with the total cost of sales of the respective sales channels.

29. The data processing system for setting a price for a product sold online by a subject merchant using a site on the internet of claim 26, wherein the pricing rules of each of the two or more sales channels are configured with the times when the most traffic comes to the respective sales channels.

* * * * *